United States Patent [19]

Ollis

[11] Patent Number: 4,483,649
[45] Date of Patent: Nov. 20, 1984

[54] BLIND HOLE ANCHOR NUT FASTENER

[76] Inventor: Martin G. Ollis, Butler's Leap, Clifton Rd. Industrial Est., Rugby, Warwickshire, England

[21] Appl. No.: 448,948

[22] Filed: Dec. 13, 1982

[51] Int. Cl.³ ............................................. F16B 13/06
[52] U.S. Cl. ........................................ 411/41; 411/49
[58] Field of Search ............... 411/177, 180, 181, 183, 411/111, 112, 113, 39, 40, 41, 42, 43, 70, 55, 49, 53, 108

[56] References Cited

U.S. PATENT DOCUMENTS

| | | | |
|---|---|---|---|
| 2,756,624 | 7/1956 | Austin | 411/43 |
| 2,954,718 | 10/1960 | Brilmyer | 411/70 |
| 3,279,303 | 10/1966 | Shackelford | 411/49 |
| 3,311,148 | 3/1967 | Leitner | 411/180 |
| 3,340,762 | 9/1967 | Bennett | 411/41 |
| 3,411,398 | 11/1968 | Blakeley | 411/41 |
| 3,493,254 | 2/1970 | Summerlin | 411/39 X |

FOREIGN PATENT DOCUMENTS 484321  1/1976  U.S.S.R. ............................ 411/70

Primary Examiner—Thomas J. Holko
Assistant Examiner—Rodney M. Lindsey
Attorney, Agent, or Firm—C. O. Marshall, Jr.

[57] ABSTRACT

A blind hole anchor nut fastener comprises a tubular sleeve and a screw-threaded nut at the end of the sleeve, so that when a screw-threaded mandrel is screw-engaged with the nut, and is displaced axially in the appropriate direction, the nut can shear from the sleeve and be drawn into the sleeve in wedging engagement. The basic nut shape is modified by making it non-circular such as trochoidal (for example) at one end and in so-doing making parts of the surface back-tapered so that in the displacement into the sleeve the non-circular shape helps in anti-rotational hold relative to the sleeve and the reduced volume resulting from the back-taper minimizes actual extension of the sleeve under the wedging action so as to reduce the possibility of the sleeve splitting.

4 Claims, 4 Drawing Figures

BLIND HOLE ANCHOR NUT FASTENER

This invention relates to blind hole anchor nut fasteners. British Pat. No. 1093714 describes a blind hole anchor nut fastener which comprises a tubular sleeve and a screw-threaded nut disposed at the end of the sleeve, the arrangement being such that when a screw-threaded mandrel extending through the sleeve and engaged with the nut is displaced axially in the appropriate direction, the nut shears from the sleeve and is drawn into the sleeve in wedging engagement therewith.

Effectively, the sleeve is expanded by the nut, and to cause this expansion the nut is generally frusto-conical, with its smallest end at the shear point and of a suitable diameter to enter the sleeve.

These anchor nuts are extremely difficult to manufacture safisfactorily. The tolerances are small, because if the nut is made too small relative to the sleeve it will not wedge satisfactorily, and if it is made too large the sleeve splits. If the shear point is too weak, nuts may shear as a result of handling in manufacture and transportation, and if the shear point is too strong, shearing will not take place but the sleeve will bell-out and be unsatisfactory for that reason.

Satisfactory manufacture is possible, indeed it is believed that nuts of said Patent have been extremely successful commercially but this has only been so because of great care in manufacturing within the prescribed tolerances, and with great difficulties in selecting material.

The object of the invention is to provide an improved nut of this kind which is capable of giving satisfactory results within wider tolerances of manufacture and/or material.

In accordance with the invention, a blind hole anchor nut fastener device of the kind comprising a tubular sleeve and a screw-threaded nut disposed at the end of the sleeve, the arrangement being such that when a screw-threaded mandrel extending through the sleeve and engaged with the nut is displaced axially in the appropriate direction, the nut is drawn into the sleeve, is characterised in that the nut has at least one face which lies on the surface of a frusto-cone having its minimum size near the sleeve and which frusto-cone is co-axial with the fastener generally, and the nut also having at least one face which is arcuate about an eccentric axis and is back-tapered.

The expression "back-tapered" means taper in the opposite direction to that of the frusto-cone.

This results in the nut tapering in opposite directions over one and the same axial length: hence the direction of taper depends upon the viewpoint. Conveniently, the nut tapers in one direction at for example three equi-spaced positions, and at intermediate positions is back-tapered.

The function or operation of the invention can be best understood by considering the case where a fastener generally as in said prior Patent is manufactured and then portions of the nut are machined away. Suppose for example that the large end of the nut is left at full diameter at three equi-spaced points, and these are connected by arcs of larger radius than the original radius of the nut at this end. At the smaller end of the nut the original machined diameter is undisturbed. In other words three generally triangular patches of material are machined away to provide the three back-tapered faces, each of these triangles being bounded by two points lying at the original larger end of the nut and the third apex at or near the smaller end of the nut. The non-circular shape, normal to the axis, results in anti-rotational hold when installed, and the back-taper reduces the stretching of the sleeve and avoids it splitting. Consequently whereas the mentioned prior art BP 1093714 relies solely on the sleeve stretching to wedge the nut, the present invention relies primarily on the sleeve becoming non-circular to hold the nut: but a certain amount of stretching can be employed with the present invention although its contribution to the grip on the nut is minor. Moreover, it is found experimentally that the sleeve can follow the taper and also the back-taper, so that part of the axial hold of the sleeve on the nut is due to this factor.

In other words when such a fastener is installed, and the nut is drawn into the sleeve, the required expansion of the sleeve is considerably reduced, and the sleeve is drawn to a complementary shape to the nut and hence becomes of different non-circular cross-section at different points along its axial length which provides an additional security against rotation.

One embodiment of the invention is now more particularly described with reference to the accompanying drawings, wherein.

Figure 1:
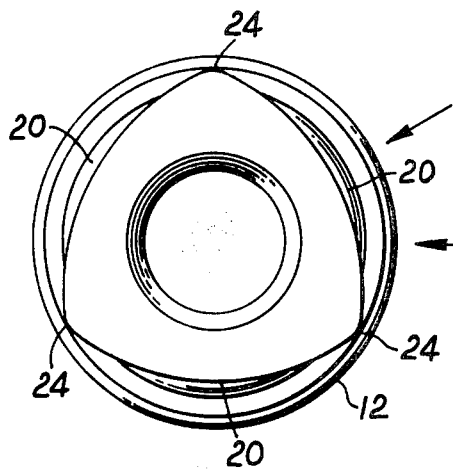
FIG. 1 is a plan view of the improved nut.

The anchor nut shown in the drawings comprises a tubular sleeve 10 having a slight lip 12 at one end and provided with an integral nut 14 at the opposite end. The nut is connected to the sleeve via shear zone 16.

Figure 3:
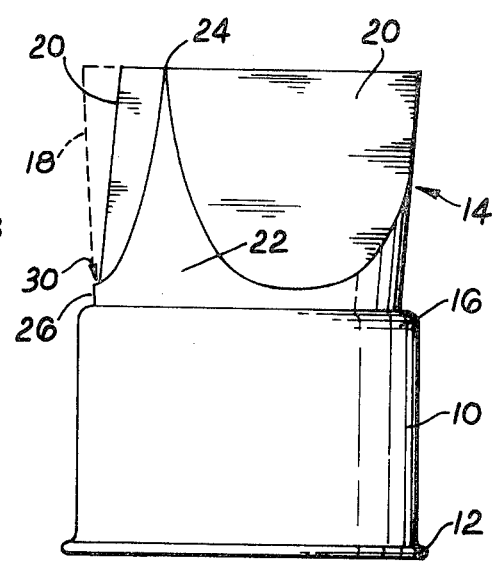
FIG. 3 is an elevation of the same in the direction of the arrow B (FIG. 1).
Figure 2:
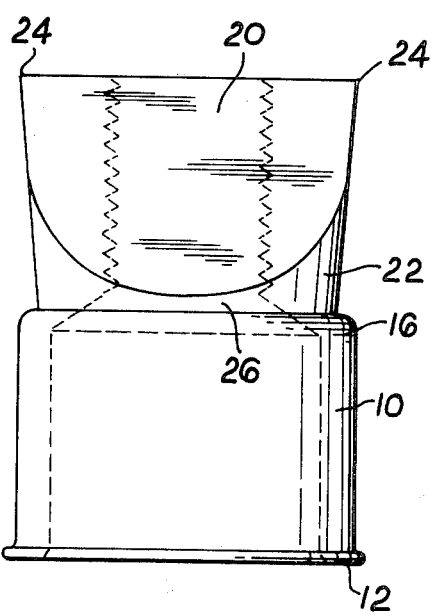
FIG. 2 is an elevation of the same in the direction of the arrow A (FIG. 1)
Figure 4:
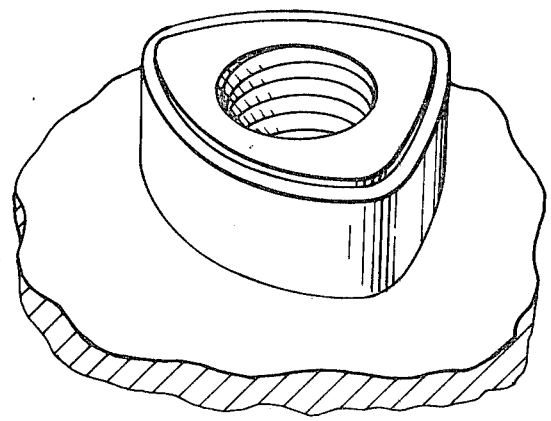
FIG. 4 is a perspective view illustrating the nut of FIGS. 1 to 3 installed on a piece of sheet material.

The nut is initially made as a frusto-cone—see the broken line FIG. 3 indicated by the reference numeral 18 showing the original full diameter of the frusto-cone. Subsequently this is machined away in three places (in this example) so as to provide three faces 20 each of which is back-tapered i.e. tapered in the opposite direction to the original frusto-cone. A portion of the original frusto-cone is left as indicated by the reference numeral 22, extending in three peaks rising at the points 24 to the larger end of the frusto-cone and extending as a complete ring as indicated at 26 at the smaller end of the frusto-cone.

The faces 20 may be stepped slightly inwards of the ring 26 to give rise to a shoulder 30 which in use, gives additional axial hold when the sleeve follows the contour over this shoulder.

The amount of metal removed can be seen by considering the portion bounded by the broken line 18 (FIG. 3). Because of the angle selected for that view, this illustrates the maximum taken on any one face, and considered around the periphery of the nut, that amount reduces down to zero where the face 20 meets the untouched surface of the original frusto-cone at the peaks 24. It is the removal of metal combined with the non-circular resulting nut which enables a satisfactory wedging action to be obtained but with a smaller displacement of metal than is required in the original design of the said prior Patent. It is this which enables a satisfactory hold to be obtained with less risk of splitting, and hence enabling a wider tolerance in tensile strength of the material specification and in manufacturing.

It is possible, using the invention, to balance the requirements of high torque load capability with low risk of splitting of the sleeve 10 to attain a result better than that possible with the prior art.

I claim:

1. A blind hole anchor nut fastener device comprising a tubular sleeve and a screw-threaded nut of substantially similar length connected to an end of the sleeve through a shear zone, wherein the improvement comprises
   (a) a frusto-conical surface, extending throughout the length of the nut, which consists essentially of at least three generally triangular portions each of which terminates in an apex at the larger end of the nut, and
   (b) at least three generally triangular machined-away faces, each of which occupies the space between two generally triangular portions of the frusto-conical surface, and each of which is arcuate about an eccentric axis, is tapered oppositely to the frusto-conical surface, and extends substantially throughout the length of the nut,
   (c) the internal diameter of the tubular sleeve being slightly less than the average diameter of the nut, and the sleeve being stretched with substantial uniformity throughout its length when the nut is pulled into substantial coincidence with the sleeve by means of a threaded mandrel.

2. A device as claimed in claim 1 wherein the back-tapered faces are arcuate about separate eccentric axes and concentric with those axes.

3. A device as claimed in claim 2 provided with three portions of frusto-conical surface and three eccentric faces.

4. A device as claimed in claim 1 wherein each back tapered face is axially shorter than the frusto-conical surface so as to leave a shoulder of such surface remaining.

* * * * *